(12) United States Patent
Heer et al.

(10) Patent No.: US 12,515,489 B2
(45) Date of Patent: Jan. 6, 2026

(54) METHOD AND DEVICE FOR ASSISTING DETECTION OF OBJECTS IN AN ENVIRONMENT OF A MOTOR VEHICLE

(71) Applicant: Robert Bosch GmbH, Stuttgart (DE)

(72) Inventors: Benjamin Heer, Backnang (DE); Frank Baehrle-Miller, Schoenaich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 102 days.

(21) Appl. No.: 18/487,646

(22) Filed: Oct. 16, 2023

(65) Prior Publication Data
US 2024/0157746 A1    May 16, 2024

(30) Foreign Application Priority Data
Nov. 15, 2022 (DE) .................. 10 2022 212 119.8

(51) Int. Cl.
*B60G 17/016* (2006.01)
(52) U.S. Cl.
CPC ........ *B60G 17/016* (2013.01); *B60G 2500/30* (2013.01); *B60G 2800/914* (2013.01)

(58) Field of Classification Search
CPC .............. B60G 17/016; B60G 2500/30; B60G 2800/914; B60G 2400/823
USPC .......................................................... 701/37
See application file for complete search history.

(56) References Cited

FOREIGN PATENT DOCUMENTS

| CN | 110588273 A | * 12/2019 | ......... B60G 17/0165 |
| DE | 102018218007 A1 | 4/2020 | |

\* cited by examiner

*Primary Examiner* — Lindsay M Low
*Assistant Examiner* — Omar Morales
(74) *Attorney, Agent, or Firm* — NORTON ROSE FULBRIGHT US LLP (57) ABSTRACT

A method for operating a driver assistance system of a motor vehicle for assisting detection of objects in an environment of the motor vehicle. The motor vehicle is equipped with a height-adjustable chassis. During a driving maneuver, the height-adjustable chassis is set into a driving position in which an object can be detected at a regular distance from the motor vehicle. During a parking maneuver, the height-adjustable chassis is automatically set into a parking position in which an object can be detected at a smaller distance from the motor vehicle. A device that is configured to carry out the method, and a corresponding computer program, are also described.

10 Claims, 6 Drawing Sheets

METHOD AND DEVICE FOR ASSISTING DETECTION OF OBJECTS IN AN ENVIRONMENT OF A MOTOR VEHICLE

CROSS REFERENCE

The present application claims the benefit under 35 U.S.C. § 119 of German Patent Application No. DE 10 2022 212 119.8 filed on Nov. 15, 2022, which is expressly incorporated herein by reference in its entirety.

FIELD

The present invention relates to a method for operating a driver assistance system of a motor vehicle for assisting detection of objects in an environment of the motor vehicle, wherein the motor vehicle is equipped with a height-adjustable chassis, and during a driving maneuver the height-adjustable chassis is set into a driving position in which an object can be detected at a regular distance from the motor vehicle. In the method, during a parking maneuver, the height-adjustable chassis is automatically set into a parking position in which an object can be detected at a smaller distance from the motor vehicle. Furthermore, the present invention comprises a device that is configured to carry out the method, and a corresponding computer program.

BACKGROUND INFORMATION

Modern assistance systems enable an automated pulling out process, which can be controlled or triggered by an operator, for example. In this case, the vehicle covers a short travel distance at low speed. The operator must ensure that there are no people or animals in the vicinity of the car who could be injured as a result of the movement of the vehicle. In an extended embodiment, the pulling out process takes place outside the visual range of the operator and thus not within the direct responsibility thereof. For this purpose, it is necessary for people and animals to be recognized entirely by the vehicle's own sensor system and for an impact and thus injury to be prevented by suitable control measures. The detection region of the environment sensor system is directed at objects in the surroundings of the vehicle which have a certain height and have a corresponding distance from the vehicle. Objects of low height that are directly at the vehicle or even under the vehicle cannot be detected by the sensor system. In this case, an operator can also easily overlook such objects.

Furthermore, there are vehicles which are equipped with height-adjustable chassis systems enabling an adaptation of the ground clearance (for example for improved terrain suitability) or an inclination of the body (for example during cornering). In this case, the vehicle body can either be raised or lowered by axle or by wheel.

German Patent Application No. DE 10 2018 218 007 A1, for example, describes a method for determining a height of an object in the environment of a vehicle. The vehicle has at least one distance sensor, which is arranged, in particular fixedly, on a body part of the vehicle. The height of the body of the vehicle relative to the road surface and thus the height of the at least one distance sensor is changed, in particular from a first position to a second position, wherein at least two distance measurements are carried out at different heights of the body of the vehicle by means of at least one distance sensor. The height of the object can then be determined as a function of the measurement data of the at least two distance measurements.

SUMMARY

A method according to the present invention advantageously makes it possible with existing sensors and actuators to improve the safety of an automated pulling out or pulling in process by better recognition of near objects. According to the present invention, this is made possible by the features disclosed herein. Example embodiments of the present invention are disclosed herein.

In a method according to the present invention for operating a driver assistance system of a motor vehicle for assisting detection of objects in an environment of the motor vehicle, the motor vehicle is equipped with a height-adjustable chassis, and, during a driving maneuver, the height-adjustable chassis is set into a driving position in which an object can be detected at a regular distance from the motor vehicle, and during a parking maneuver, the height-adjustable chassis is automatically set into a parking position in which an object can be detected at a smaller distance from the motor vehicle.

This is to be understood as meaning that the method can assist the detection, ascertainment, perception, recognition and/or identification of objects. In particular, detection of objects of low height and/or objects in the vicinity of the motor vehicle is enabled. The detectability of the objects is understood here to mean that the objects in the environment of the motor vehicle are detected, for example, by means of a sensor system of the motor vehicle. The sensor system can be understood to mean, for example, the front camera and/or an ultrasonic sensor, or other types of sensors. A combination of multiple sensors, or sensor types, is also possible. Furthermore, the method can also assist a direct visual detection of the objects by means of the driver. The method enables or improves in particular detectability during a parking maneuver. The parking maneuver is understood to mean the execution of a parking process. This can be a pulling in process or a shutting down process, as well as a pulling out process or an initial starting up process.

The motor vehicle comprises a height-adjustable chassis (also called adaptive chassis). For example, an overall system of a plurality of active spring-damper units is understood as such. By setting the chassis, a change in the position and/or orientation of the body can be effected. For example, the body can be raised or lowered by extending or shortening all the spring-damper units of each wheel. By setting or adjusting the chassis, a change of the environment sensors fixedly connected to the body can be effected accordingly. In this way, a change in the absolute position and/or orientation of an environment sensor can be achieved by adjusting the chassis. The adaptive chassis advantageously also enables an adjustment by axle, which leads to a change in the inclination of the environment sensor about the vehicle transverse axis. The adaptive chassis also enables, for example, an adjustment by side, which leads to a change in the inclination of the environment sensor about the vehicle longitudinal axis. By an individual adjustment of each active spring-damper unit, even a simultaneous change about the vehicle transverse axis and longitudinal axis is possible.

According to an example embodiment of the present invention, the setting of the height-adjustable chassis into a parking position is designed in such a way that the body is brought into a state in which, for example, detection of objects in a region close to the motor vehicle is enabled by means of the front camera. This represents a contrast to the normal position, which is defined as setting of the height-adjustable chassis into a driving position in which detection of objects with the front camera is enabled at a regular distance from the motor vehicle. The setting of the height-adjustable chassis, for example from a driving position to a parking position, is therefore to be understood as an adjustment from a regular, first state to a changed second state.

According to an example embodiment of the present invention, during a parking maneuver, the height-adjustable chassis is thus automatically adjusted in such a way that objects located in a region close to the motor vehicle can be detected better. The detection is thus focused on objects located closer to the motor vehicle in the environment. For example, in the set parking position, a detection region of a sensor is changed such that an object closer to the motor vehicle can be detected (in comparison with a set driving position). Specifically, during an automated parking process, the body of a motor vehicle can be aligned vertically by means of the spring-damper units of the height-adjustable chassis at the individual wheels in such a way that the detection region of the permanently installed environment sensor system covers a region closer to the vehicle due to the resulting vehicle inclination.

It should be noted here that the so-called parking position does not have to be static. Rather, it can also dynamically follow the driving profile of the pulling in or pulling out maneuver in question. For example, a parking process is often associated with multiple maneuvering operations, wherein not only a different sensor, but also a different state of the height-adjustable chassis, can enable optimal detectability of relevant objects in each direction of travel. The same applies to a parking maneuver, for example onto a parking strip, which is associated with a steering maneuver: in this case, a different orientation of the chassis or sensor can be suitable in all positions of the motor vehicle during the steering maneuver in order to detect relevant objects in the immediate environment of the motor vehicle—and should be set accordingly.

In an advantageous embodiment of the present invention, in the method, the height-adjustable chassis in the parking position is set such that an object can be detected in the direction of travel of the motor vehicle during the parking maneuver.

This is understood to mean that the adaptive chassis is set during a parking maneuver such that detection of an object in the direction of travel of the motor vehicle is improved during the parking maneuver.

In one possible embodiment of the present invention, in the method, the height-adjustable chassis in the parking position is set such that an object can be detected in relation to the route of the motor vehicle during the parking maneuver.

This is understood to mean that during a parking maneuver the adaptive chassis is set in such a way that objects on the route or in an immediate environment of the route of the motor vehicle can be detected. The route can be understood as the current vehicle position and the expected future vehicle positions. Objects along the planned driving path or driving trajectory can thus advantageously be ascertained.

In a preferred embodiment of the present invention, in the method, the height-adjustable chassis is adapted continuously in accordance with a current and/or future movement of the motor vehicle during execution of the parking maneuver.

A continuous adaptation describes an ongoing and/or consistent adaptation or also an adaptation at regular intervals. As described, the adaptation comprises a readjustment or adjustment of the current position, or a setting of a new position of the adaptive chassis.

For example, body inclination is continuously adapted to a change in direction of the vehicle during the automated parking maneuver. By way of example, the process would proceed as follows. (a) The vehicle is to be moved in a left-hand curve in the forward direction. (b) The body is lowered to the front left by being raised at the right rear wheel and optionally lowered at the front left wheel. (c) The vehicle executes the movement, stops and is to be moved straight in the reverse direction (direction reversal during parking maneuver). (d) The body is raised at the front axle and lowered at the rear axle. (e) The vehicle executes the movement and the automated parking process is complete. (f) The chassis is reset to the normal state.

In an alternative development of the present invention, in the method, the height-adjustable chassis is set into a parking position during a pulling in maneuver and/or a shutting down process and/or a pulling out maneuver and/or a starting up process.

A parking maneuver is correspondingly understood to be, for example, a pulling in maneuver and/or a shutting down process and/or a pulling out maneuver and/or an initial starting up process. Since an improved close recognition of the environment sensor system is at the expense of the recognition of objects at a greater distance, it is advantageously provided to set the described parking position at the height-adjustable chassis only during the starting up process.

In an advantageous embodiment of the present invention, in the method, the height-adjustable chassis in the parking position is set such that a defined inclination of a body of the motor vehicle about a vehicle transverse axis and/or a vehicle longitudinal axis is produced.

This is understood to mean that the chassis is changed such that a corresponding desired inclination and/or height of the vehicle body results. The sensors are permanently installed with the body, so that a corresponding correlated change in the position or orientation of the sensor can be set by the defined change in the position or orientation of the body.

In one possible embodiment of the present invention, in the method, the height-adjustable chassis in the parking position is set such that a defined height of a body of the motor vehicle above the ground is produced.

In a preferred development of the present invention, in the method, the detection of the object takes place at the smaller distance from the motor vehicle by means of an environment sensor system of the motor vehicle, wherein in particular the detection of the object comprises recognition of the object and/or a distance measurement with respect to the object.

The environment sensor system of the motor vehicle is understood in particular as a video system, for example the front camera and/or a rear-view camera. Alternatively or additionally, the environment sensor system can also comprise an ultrasonic sensor and/or a lidar and/or a radar.

In an alternative embodiment of the present invention, the method includes at least one of the following further method steps: setting the height-adjustable chassis to a reduced height if a conclusion of a pulling in process and/or shutting down process of the motor vehicle is recognized; setting the height-adjustable chassis to a height that the motor vehicle had before being shut down, when a start of a pulling out process and/or starting up process is recognized.

This is understood to mean that the height-adjustable chassis is lowered when the conclusion of a pulling in process and/or shutting down process of the motor vehicle is recognized; and/or the height-adjustable chassis is reset to the earlier height when the start of a pulling out process and/or starting up process is recognized. The setting to a reduced height is to be understood in particular in relation to the parking position of the adaptive chassis, i.e., the final position is lowered further in relation to the parking position. Alternatively, the reduced height can also be designed, i.e., lowered, in relation to the driving position of the adaptive chassis. In a further advantageous embodiment, the ground clearance of the vehicle is lowered to a minimum, i.e., lowest possible, height when shut down. By reducing the height of the adaptive chassis, the body of the motor vehicle is lowered. The underbody of the motor vehicle is also lowered in the process. This makes it impossible or at least more difficult for living objects, for example pets, to creep under the parked motor vehicle.

In an advantageous development of the present invention, the method including the following method step: communicating information relating to the automated setting of the height-adjustable chassis into a parking position to the driver.

In one possible embodiment of the present invention, the method includes the following method step: interrupting and/or terminating the automated setting of the height-adjustable chassis into a parking position by the driver.

In a preferred embodiment of the present invention, the method includes the following method step: executing the automated setting of the height-adjustable chassis into a parking position when the driver confirms an execution of the setting.

This method can be implemented, for example, in software or hardware or in a mixed form of software and hardware, for example in a control device.

The approach presented here further provides a device which is designed to carry out, actuate or implement the steps of a variant of a method according to the present invention presented here in corresponding apparatuses. The object of the present invention can also be achieved quickly and efficiently by this design variant of the present invention in the form of a device.

In the present case, a device can be understood to be an electrical device that processes sensor signals and, on the basis of these signals, outputs control and/or data signals. The device can have an interface that can be designed as hardware and/or software. In a hardware embodiment, the interfaces can be part of a so-called system ASIC, which comprises a variety of functions of the device. However, it is also possible for the interfaces to be separate integrated circuits or at least partially consist of discrete components. In the event of a software embodiment being used, the interfaces can be software modules that are present, for example, on a microcontroller in addition to other software modules.

Therefore, the device can be a motor vehicle or an assistance system for a motor vehicle, in particular a parking assistant for (partially) automated execution of parking maneuvers, an environment detection device, in particular a camera, an ultrasound, a lidar and/or a radar, a central or decentralized control unit, which is configured to control one of the devices mentioned or to execute the method described. Such a device can also be understood as a height-adjustable chassis or a part of a height-adjustable chassis, such as an adaptive spring-damper units and/or a correspondingly configured control unit.

A computer program product or a computer program with program code that can be stored on a machine-readable carrier or storage medium, such as a semiconductor memory, a hard disk memory, or an optical memory, and that is used for carrying out, implementing, and/or actuating the steps of the method according to one of the embodiments of the present invention described above is advantageous as well, in particular when the program product or program is executed on a computer or a device.

It should be noted that the features listed individually in the description may be combined with one another in any technically useful manner and indicate further embodiments of the present invention. Further features and usefulness of the present invention will be apparent from the description of exemplary embodiments with reference to the figures.

BRIEF DESCRIPTION OF THE DRAWINGS

In each case, figure part A shows the vehicle with a driving position setting of the chassis, and figure part B shows the motor vehicle with a parking position setting of the chassis.

DETAILED DESCRIPTION OF EXAMPLE EMBODIMENTS

Figure 1A:
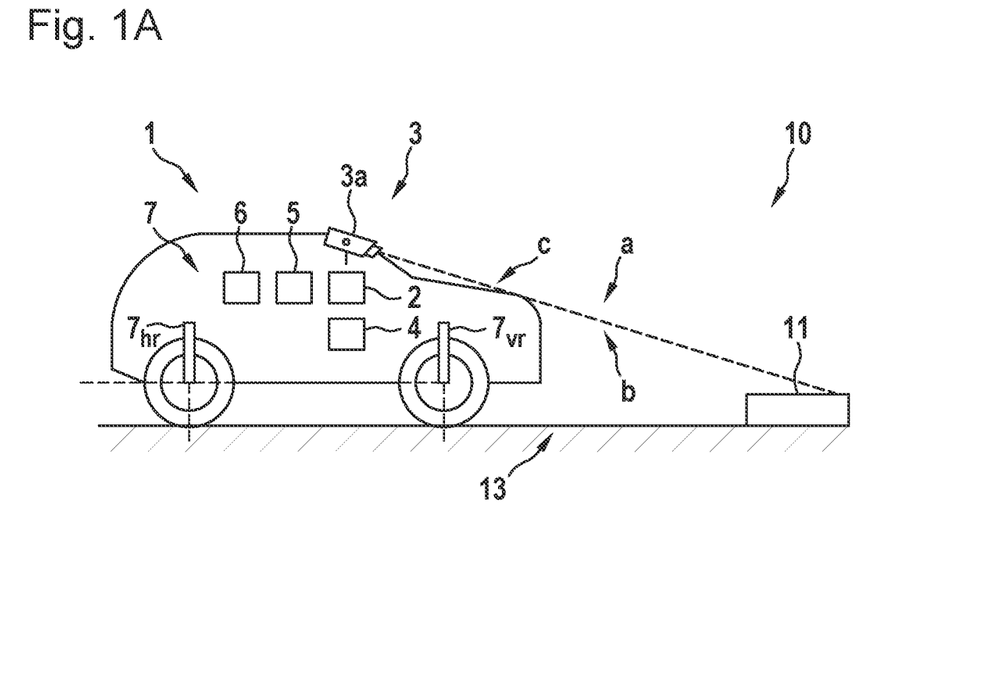
FIGS. 1A and 1B show schematic representations of an example embodiment of the present invention in a first environment situation
Figure 1B:
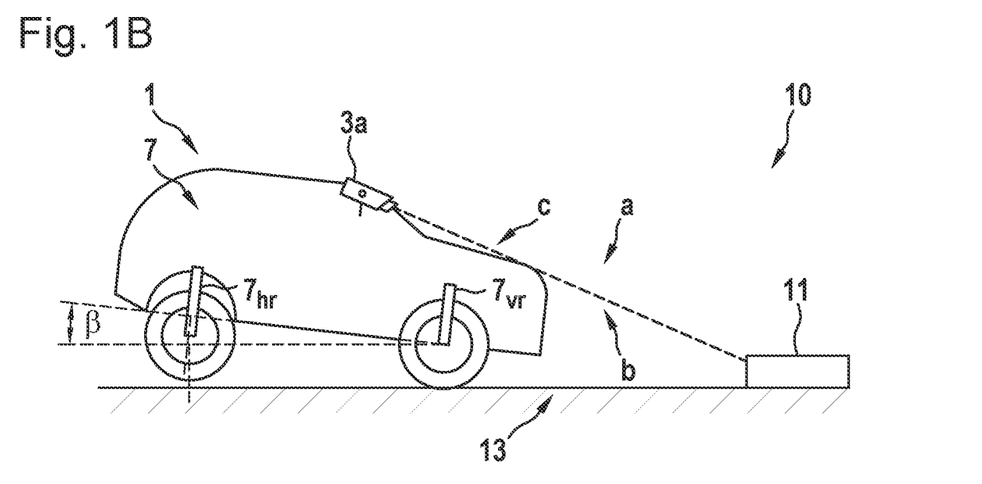

FIGS. 1A and 1B show schematic representations of an embodiment of the present invention in a first environment and traffic situation. A motor vehicle 1 (also referred to as ego vehicle) is shown in a parking region 13. An environment object 11 (also called object) is present in an environment 10. This can be, for example, a curbstone or the edge of a curb. Alternatively, a toy, for example ball, or else an animal can also be taken into account as such an environment object 11.

The motor vehicle 1 comprises a driver assistance system 2 (also called a driving assistant). This can be designed, for example, as a parking assistant for executing (partially) automated parking maneuvers. Also shown is a sensor system 3 for detecting the environment (also referred to as environment sensor system). This comprises, for example, a front camera 3a. Of course, further cameras and alternatively or additionally ultrasonic sensors, radar, lidar, or other suitable sensor types can also be used. A detectable region a (also called visible region or detection region) is shown. In the detectable region a, an environment object 11 can be recognized, for example by means of the camera 3a. Also shown is a boundary line c, which delimits the detectable region a from a non-detectable region b (also referred to as non-visible region).

The motor vehicle 1 further comprises a computing unit 4 (also referred to as a control unit) for evaluating the sensor data and/or for carrying out the method and/or for controlling the actuators. The motor vehicle 1 further comprises an actuator system 5. This comprises, for example, an actuator for longitudinal control and/or lateral control for executing the (partially) automated parking maneuver. Furthermore, a device 6 is configured to provide information to the driver, for example information regarding an execution of the (partially) automated parking maneuver. Said device 6 can transmit information to the driver, for example, in a visual and/or acoustic and/or haptic manner.

In addition, a height-adjustable chassis 7 (also referred to as adaptive chassis) is shown. This comprises, for example, height-adaptable spring-damper units for each wheel. Of these, a spring-damper unit $7_{vr}$ for the front right wheel and a spring-damper unit $7_{hr}$ for the rear right wheel are shown. The height-adjustable chassis 7 can be set, for example, by means of the computing unit 4 or a separate control unit.

FIG. 1A shows the motor vehicle 1, wherein the height-adjustable chassis 7 is set into a driving position. The sensor system 3 fixedly installed in the body, in this case the camera 3a, is oriented such that objects can be detected at a certain height and distance from the motor vehicle 1. The definition of the orientation is focused on the regular driving process. The curb edge 11 is correspondingly too low, or too close to the vehicle, and therefore cannot be detected. However, if the motor vehicle 1 recognizes that a parking maneuver is being carried out, or is imminent, the height-adjustable chassis is set into a parking position. A parking maneuver can be recognized, for example, when the driver activates a parking assistant. Alternatively or additionally, a parking maneuver can also be recognized automatically, for example if a navigation system of the vehicle has ascertained that a defined destination has been reached. A parking maneuver can also be recognized if the vehicle 1 is located on or in the immediate vicinity of a defined parking region 13. A parking region 13 can be, for example, a designated parking lot or a parking bay next to a road. Such information can be taken from a digital road map, for example.

FIG. 1B shows the motor vehicle 1, wherein the height-adjustable chassis 7 is set into a parking position. In this case, the length of the rear spring-damper units has been increased. The rear right spring-damper unit $7_{hr}$ is shown. The body of the motor vehicle 1 is thereby raised at the rear. Since the front spring-damper units, for example $7_{vr}$, are not raised, a change in the inclination of the body by an angle β results. The camera, which is permanently installed with the body, is correspondingly tilted forward. This means that the detection region of the camera is adjusted downward. As a result, the curb edge 11 is now located within the detectable region a and can be detected by the camera 3a. Accordingly, this object can be taken into account in the execution of the automated parking maneuver.

Of course, it is alternatively or additionally also possible, although not shown in FIGS. 1A and 1B, for the body to be lowered in the front region of the motor vehicle 1 by reducing the length of the front spring-damper units, for example $7_{vr}$, and for the desired effect to be achieved or intensified thereby.

Figure 2A:
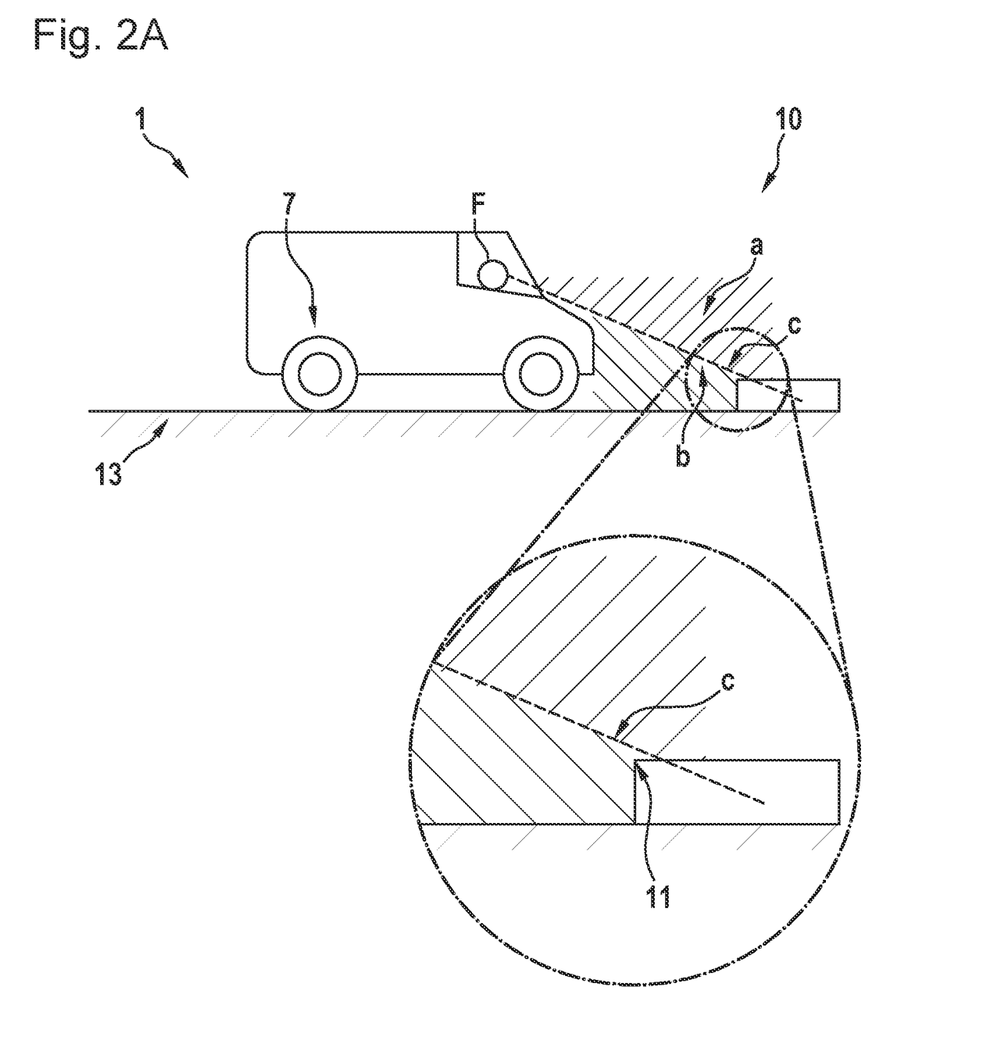
FIGS. 2A and 2B show schematic representations of an example embodiment of the present invention in a second environment situation.
Figure 2B:
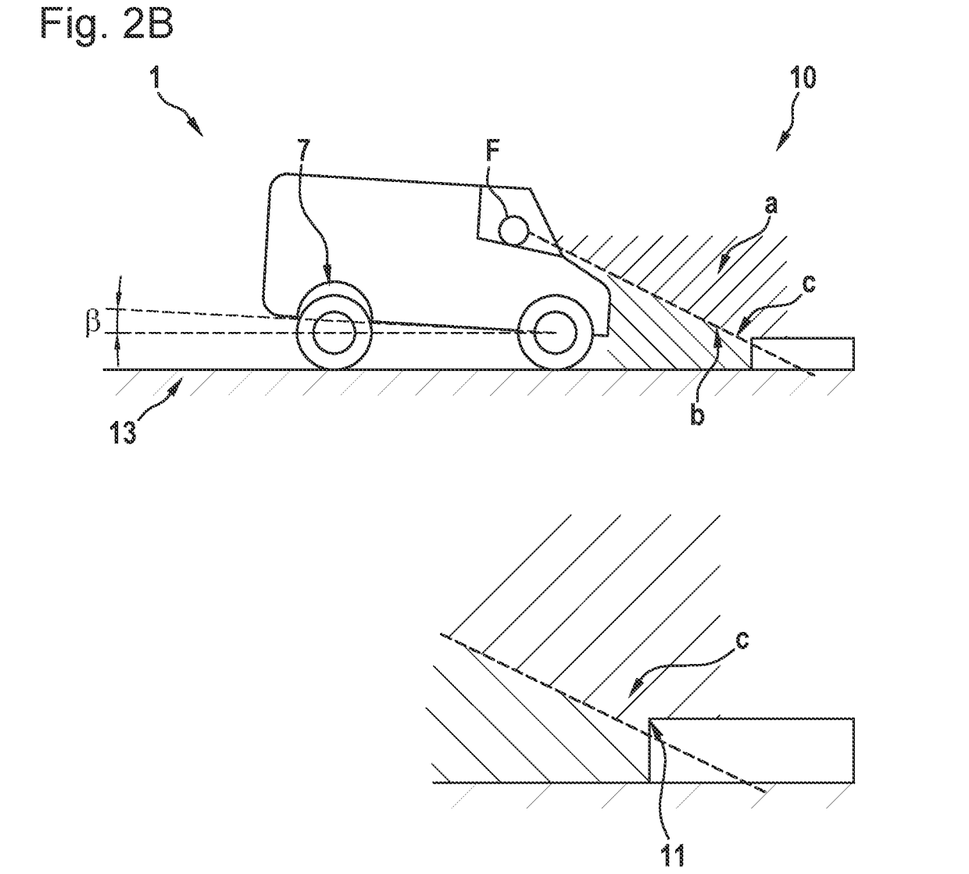

FIGS. 2A and 2B are schematic representations of an embodiment of the present invention in a second environment and traffic situation. In contrast to FIGS. 1A and 1B, the monitoring of the environment during execution of a parking maneuver is not carried out by a sensor system 3 for environment detection, but by the driver F. However, a visible region a and a non-visible region b are also produced here. The boundary line c of the visibility is defined by the visual ray of the driver F, which is determined by the external vehicle geometry (for example the contour of the engine hood) and the position of the eye of the driver. FIG. 2A shows a situation in which the height-adjustable chassis 7 of the motor vehicle 1 is set into a driving position and the curb edge 11 is not detectable by the driver. Since a parking situation is recognized, an automated setting of the height-adjustable chassis 7 of the motor vehicle 1 into a parking position takes place. In this case, the rear spring-damper units are again activated and their length is increased. FIG. 2B shows a setting of the height-adjustable chassis 7 into a parking position. The raising of the rear of the body results in a change in the inclination of the motor vehicle 1 by an inclination angle β. This also has an influence on the engine hood, which is rotated downward about the front axle. The boundary line c of the visibility is thereby changed, so that the curb edge 11 passes into the visible region a for the driver F. Accordingly, this object can be taken into account by the driver F during the execution of the parking maneuver.

Figure 3A:
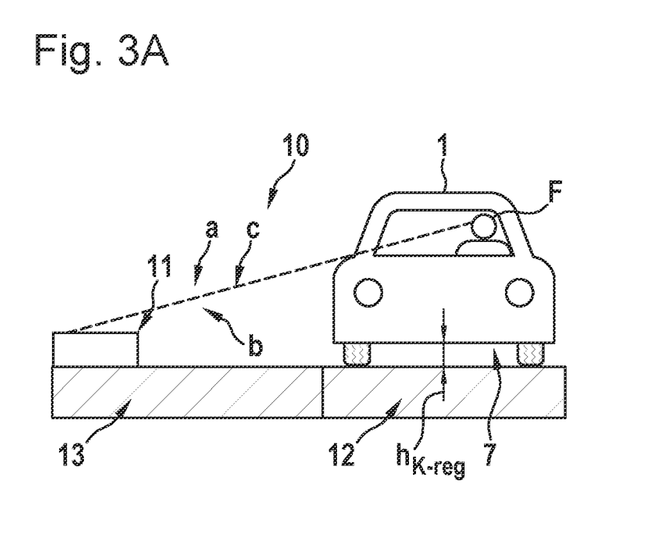
FIGS. 3A and 3B show schematic representations of an embodiment of the present invention in a third environment situation.
Figure 3B:
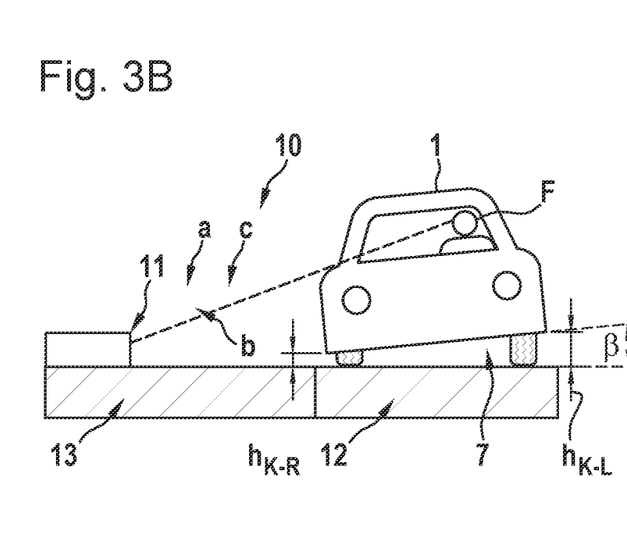

FIGS. 3A and 3B are schematic representations of an embodiment of the present invention in a third environment and traffic situation. In this case, an inclination of the body of the motor vehicle about a vehicle longitudinal axis takes place during and by means of the setting of the height-adjustable chassis into a parking position—instead of about a vehicle transverse axis as in FIGS. 1A and 1B and FIGS. 2A and 2B. FIG. 3A shows a motor vehicle 1 on a driving region 12, for example a lane of a road, next to a parking region 13, for example a parking bay. As in FIGS. 2A and 2B, the monitoring of the environment is not carried out by a sensor system 3 for environment detection, but by the driver F. In FIG. 3A, the height-adjustable chassis is set into a driving position. The body is in this case parallel and at a defined regular height $h_{K\text{-}reg}$ above the ground of the roadway. The curb edge 11 is below the boundary line c of the visibility, i.e., the curb edge 11 is in the non-visible region b for the driver F. When a parking maneuver is executed, the height-adjustable chassis is now automatically set to a parking position. FIG. 3B shows a setting of the height-adjustable chassis 7 into a parking position. The spring-damper units of the right-hand side of the motor vehicle are reduced in length and the spring-damper units of the left-hand side of the motor vehicle 1 are raised. This results in the body being lowered to a height $h_{K\text{-}R}$ on the right-hand side and the body being raised to a height $h_{K\text{-}L}$ on the left-hand side. This results in an inclination angle β of the body about a vehicle longitudinal axis. The boundary line c of the visibility is thereby changed, so that the curb edge 11 passes into the visible region a for the driver F. Accordingly, this object can be taken into account by the driver F during the execution of the parking maneuver.

Figure 4A:
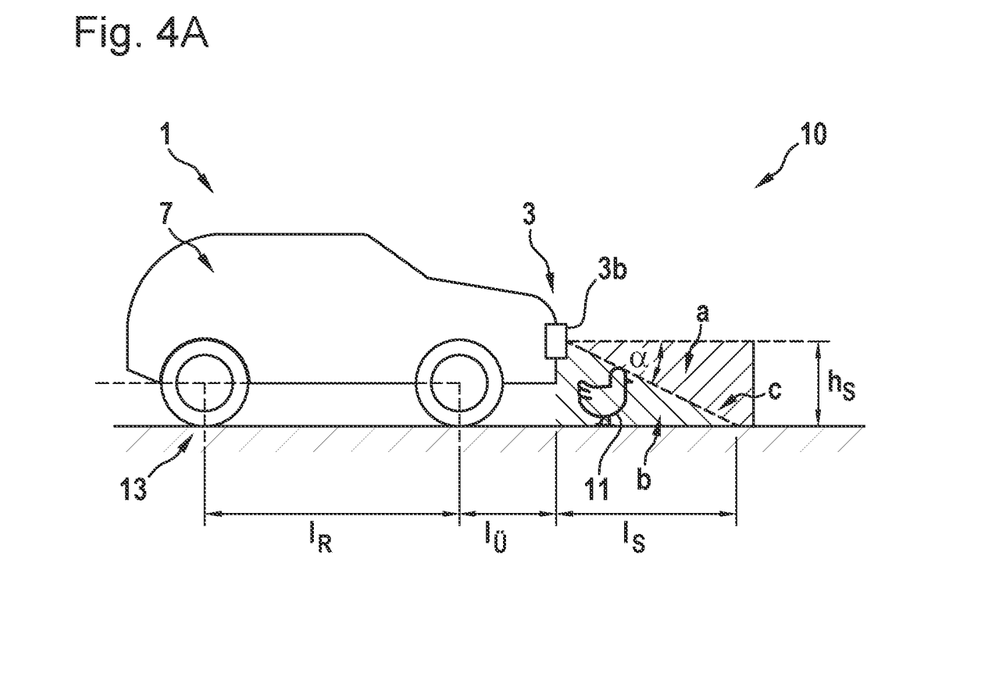
FIGS. 4A and 4B show schematic representations of an embodiment of the present invention in an alternative environment situation.
Figure 4B:
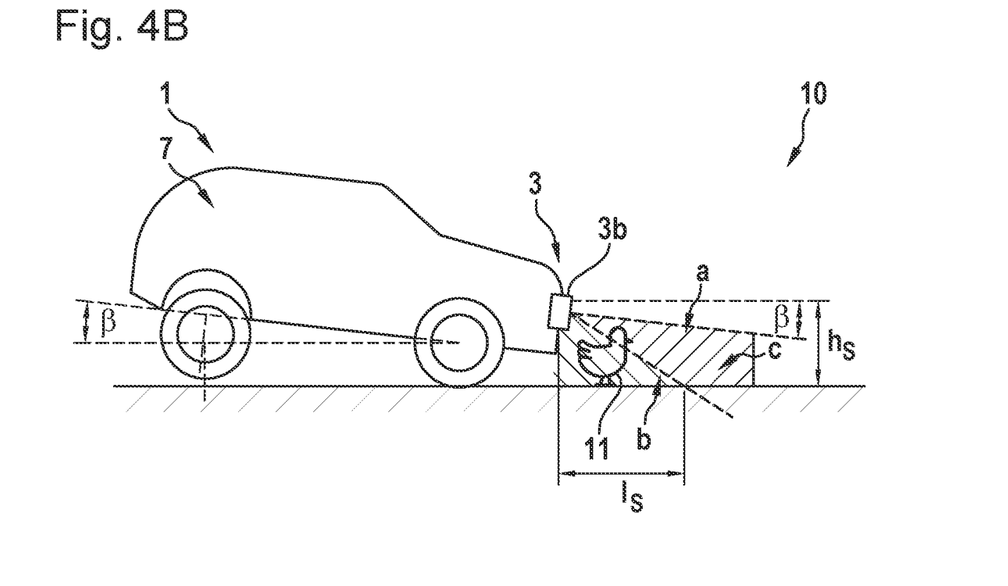

FIGS. 4A and 4B show schematic representations of an embodiment of the present invention in an alternative environment and traffic situation. An improvement in relation to a limited detection angle of a sensor is shown here. By way of example, an ultrasonic sensor 3b, which is installed in the front bumper of the motor vehicle 1, is described here as the environment sensor system 3. FIG. 4A again shows a motor vehicle 1 in which the height-adjustable chassis is set into a driving position.

By way of example, the following parameters are assumed for the environment sensor system 3 and the motor vehicle 1. Wheelbase of the motor vehicle $l_R$: 3100 mm. Front overhang of the motor vehicle $l_u$: 870 mm. Distance of environment sensor system from ground $h_s$: 524 mm. Vertical detection angle of the environment sensor system α: 30°. The distance $l_s$ at which the detection angle of the environment sensor system meets the ground is ascertained as a comparative variable. A distance $l_s$=908 mm results for the exemplary motor vehicle. In cross section, this results in a vertical area for the non-monitored region of 0.238 m².

Within this non-detectable region b, objects cannot be detected, such as the illustrated pet 11.

The present invention comprises a method in which the vehicle body is inclined by means of a height-adjustable chassis in the direction of movement of the motor vehicle 1, for example during an automated parking maneuver. As a result, the height of the ultrasonic sensor 3$b$ is lowered in the direction of movement and its detection region is also pivoted downward (without moving the ultrasonic sensor 3$b$, which is fixedly installed on the motor vehicle 1). Due to the changed sensor position or orientation, smaller objects that are located immediately around the motor vehicle 1 can be recognized in the first place or at least better recognized.

FIG. 4B shows the motor vehicle 1, which is to be moved straight ahead for an exemplary pulling out maneuver. In this case, the height-adjustable chassis 7 is set into a parking position. For this situation, for example, the rear axle is raised by 80 mm by means of the proposed method and the vertical detection region of the environment sensor system 3 is thus inclined downward by 1.5°. The front overhang of the motor vehicle 1 tilts downward, so that the vertical distance of the environment sensor system 3 from the ground $h_s$ decreases by 22 mm from 524 mm originally to 502 mm.

Due to the inclination of the body of the motor vehicle 1 in the longitudinal direction by 1.5°, the orientation of the environment sensor system 3 also changes, so that an angle of 31.5° between the horizontal and the lower limit of the vertical detection angle $\alpha$ results. This reduces $l_s$ by 89 mm to 819 mm and consequently results in a vertical area in cross section for the non-monitored region of 0.206 m². The space b in front of the motor vehicle 1 that the environment sensor system 3 cannot detect is correspondingly smaller. The areas of the non-detected region b, which are reduced in the example by 13.5% by the vehicle inclination, were ascertained as comparative variables.

It can also be seen in FIG. 4B that the detectable region a now also detects (at least parts) of the object 11, so that this object can be recognized and can be taken into account in the execution of the automated parking maneuver.

Figure 5A:
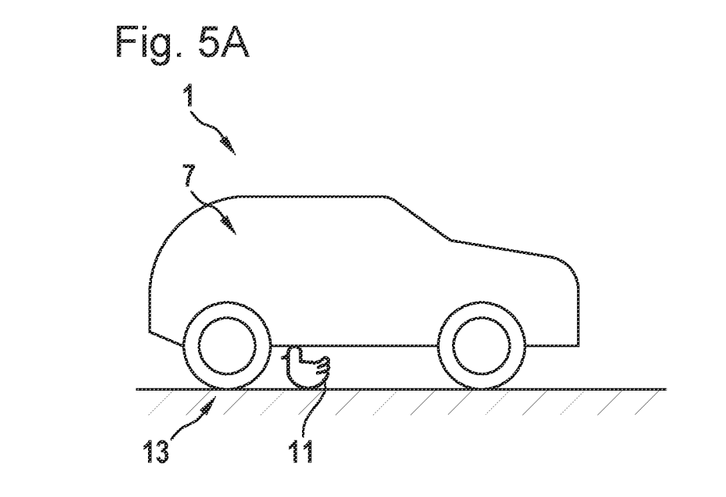
FIGS. 5A and 5B show a schematic representation of an embodiment of the present invention in a further environment situation.
Figure 5B:
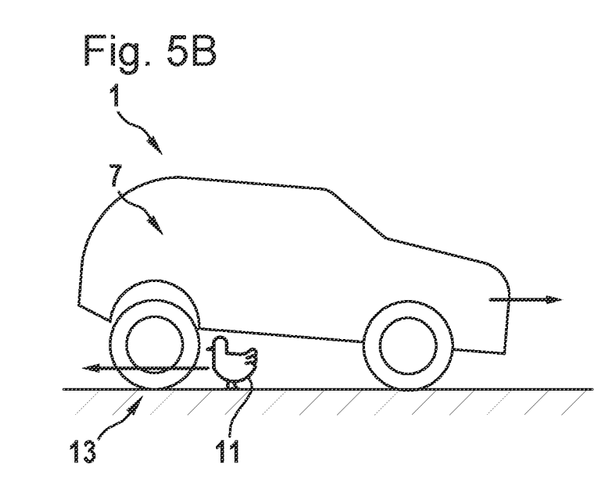

FIGS. 5A and 5B show schematic representations of an embodiment of the present invention in a further environment and traffic situation. As already illustrated in the embodiments shown, the height-adjustable chassis is automatically set into a parking position during a parking maneuver. In this case, for example, the region of the motor vehicle 1 that is located opposite to the direction of travel or to the planned route (for example the rear during forward driving) is raised. Alternatively or additionally, the region of the motor vehicle 1 that is located in the direction of travel (for example the front during forward driving) is lowered. As an accompanying effect, the distance of the vehicle underbody decreases toward the route and is even increased in the opposite direction to the route. In the event that a living being has crept under the parked motor vehicle 1, the escape route is spatially facilitated counter to the direction of travel. The situation is shown by way of example in FIG. 5B. As a result, the possibility of escape can be facilitated for living objects located under the vehicle. Due to the vehicle inclination, the region under the motor vehicle is reduced in height toward the greatest danger region (route) and increased in the opposite direction. This means that the possibility of escape is improved precisely counter the direction of travel and even made more difficult in the direction of travel. The setting of the vehicle inclination is advantageous not only for living beings, but also for objects that have rolled under the car (for example toy, ball, etc.) and may have become jammed there. By changing the inclination, the objects are automatically released during a vehicle movement. Damage to underbody components or the objects is minimized.

In an advantageous embodiment, the ground clearance of the vehicle after shutdown can additionally be set to a minimum height in order to make it more difficult for animals to creep under the parked vehicle and thus in order to reduce same.

What is claimed is:

1. A method for operating a driver assistance system of a motor vehicle for assisting detection of objects in an environment of the motor vehicle, wherein the motor vehicle is equipped with a height-adjustable chassis, the method comprising the following steps:
   during a driving maneuver, setting the height-adjustable chassis into a driving position in which an object can be detected at a regular distance from the motor vehicle; and
   during a parking maneuver, automatically setting the height-adjustable chassis into a parking position in which an object can be detected at a smaller distance from the motor vehicle, wherein the height-adjustable chassis in the parking position is set such that an object can be detected in a direction of travel of the motor vehicle during the parking maneuver.

2. The method according to claim 1, wherein the height-adjustable chassis in the parking position is set such that an object can be detected in relation to a route of the motor vehicle during the parking maneuver.

3. The method according to claim 1, wherein the height-adjustable chassis is adapted continuously in accordance with a current and/or future movement of the motor vehicle during execution of the parking maneuver.

4. The method according to claim 1, wherein the height-adjustable chassis is set into the parking position during a pulling in maneuver and/or a shutting down process and/or a pulling out maneuver and/or a starting up process.

5. The method according to claim 1, wherein the height-adjustable chassis in the parking position is set such that a defined inclination of a body of the motor vehicle about a vehicle transverse axis and/or a vehicle longitudinal axis is produced.

6. The method according to claim 1, wherein the height-adjustable chassis in the parking position is set such that a defined height of a body of the motor vehicle above the ground is produced.

7. The method according to claim 1, wherein the detection of the object takes place at the smaller distance from the motor vehicle using an environment sensor system of the motor vehicle, wherein the detection of the object including recognition of the object and/or a distance measurement with respect to the object.

8. The method according to claim 1, further comprising at least one of the following steps:
   setting the height-adjustable chassis to a reduced height when a conclusion of a pulling in process and/or shutting down process of the motor vehicle is recognized;
   setting the height-adjustable chassis to a height that the motor vehicle had before being shut down, when a start of a pulling out process and/or starting up process is recognized.

9. A device for operating a driver assistance system of a motor vehicle for assisting detection of objects in an environment of the motor vehicle, wherein the motor vehicle is equipped with a height-adjustable chassis, the device configured to:

during a driving maneuver, set the height-adjustable chassis into a driving position in which an object can be detected at a regular distance from the motor vehicle; and during a parking maneuver, automatically set the height-adjustable chassis into a parking position in which an object can be detected at a smaller distance from the motor vehicle, wherein the height-adjustable chassis in the parking position is set such that an object can be detected in a direction of travel of the motor vehicle during the parking maneuver.

10. A non-transitory machine-readable storage medium on which is stored a computer program for operating a driver assistance system of a motor vehicle for assisting detection of objects in an environment of the motor vehicle, wherein the motor vehicle is equipped with a height-adjustable chassis, the computer program, when executed by a computer, causing the computer to perform the following steps:

during a driving maneuver, setting the height-adjustable chassis into a driving position in which an object can be detected at a regular distance from the motor vehicle; and during a parking maneuver, automatically setting the height-adjustable chassis into a parking position in which an object can be detected at a smaller distance from the motor vehicle, wherein the height-adjustable chassis in the parking position is set such that an object can be detected in a direction of travel of the motor vehicle during the parking maneuver.

* * * * *